United States Patent
Osaki

(10) Patent No.: US 12,339,662 B2
(45) Date of Patent: Jun. 24, 2025

(54) SHIP CONTROL DEVICE, SHIP CONTROL METHOD, AND SHIP CONTROL PROGRAM

(71) Applicant: FURUNO ELECTRIC CO., LTD., Hyogo (JP)

(72) Inventor: Shigeki Osaki, Amagasaki (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 534 days.

(21) Appl. No.: 17/823,217

(22) Filed: Aug. 30, 2022

(65) Prior Publication Data

US 2023/0114136 A1   Apr. 13, 2023

(30) Foreign Application Priority Data

Oct. 13, 2021 (JP) ................. 2021-167772

(51) Int. Cl.
   *G05D 1/00* (2006.01)
   *B63B 79/15* (2020.01)
   *B63B 79/40* (2020.01)
   *B63H 21/21* (2006.01)

(52) U.S. Cl.
   CPC .......... *G05D 1/0206* (2013.01); *B63B 79/15* (2020.01); *B63B 79/40* (2020.01); *B63H 21/21* (2013.01); *B63H 2021/216* (2013.01)

(58) Field of Classification Search
   CPC ...... G05D 1/0206; B63H 21/21; B63B 79/15; B63B 79/40
   See application file for complete search history.

(56) References Cited

FOREIGN PATENT DOCUMENTS

JP   2013151241 A  *  8/2013  ............ B63H 21/21
JP   2021098391 A  *  7/2021  ............ B63H 21/21

* cited by examiner

*Primary Examiner* — S. Joseph Morano
*Assistant Examiner* — Jovon E Hayes
(74) *Attorney, Agent, or Firm* — Studebaker Brackett PLLC

(57) ABSTRACT

To improve prediction accuracy in model predictive control. The ship control device includes processing circuitry. The processing circuitry estimates an initial search value of a throttle opening by an estimation method based on uncertainty with a distance between a position of the ship and a target position of dynamic positioning, and a true wind velocity as preconditions. The processing circuitry searches an action for moving the ship to the target position by a model predictive control in a search range having the initial search value as an origin, and determines a command throttle opening based on the search result.

18 Claims, 10 Drawing Sheets

|  | ZE(w) | S(w) | B(w) |
|---|---|---|---|
| ZE(d) | S | M | B |
| B(d) | M | B | B |

FIG. 5A

|  | ZE(w) | S(w) | B(w) |
|---|---|---|---|
| ZE(d) | S | S | S |
| B(d) | M | S | S |

FIG. 5B

| Ship position x coordinate sign | Sign of ship position yw coordinates | w-yw coordinate system Bow direction w | throttle Code |
|---|---|---|---|
| + | + | 0-90 | − |
| + | + | 90-180 | − |
| + | + | 180-270 | + |
| + | + | 270-360 | − |
| − | + | 0-90 | − |
| − | + | 90-180 | + |
| − | + | 180-270 | − |
| − | + | 270-360 | − |
| − | − | 0-90 | + |
| − | − | 90-180 | − |
| − | − | 180-270 | − |
| − | − | 270-360 | + |
| + | − | 0-90 | + |
| + | − | 90-180 | − |
| + | − | 180-270 | − |
| + | − | 270-360 | + |

FIG. 10

SHIP CONTROL DEVICE, SHIP CONTROL METHOD, AND SHIP CONTROL PROGRAM

CROSS-REFERENCE TO RELATED APPLICATION

This application claims the priority benefit of Japan application serial No. 2021-167772, filed on Oct. 13, 2021. The entirety of the above-mentioned patent application is hereby incorporated by reference herein and made a part of this specification.

BACKGROUND

The present disclosure relates to a technique for holding a ship at a fixed point.

The conventional method using model predictive control has a problem that the prediction cannot be performed with high accuracy.

Therefore, it is an object of the present disclosure to provide a ship control technique for improving prediction accuracy in model predictive control.

SUMMARY

The ship control system includes a processing circuitry configured to estimate an initial search value of a throttle opening by an estimation method based on uncertainty with a distance between a position of a ship and a target position of dynamic positioning, and a true wind velocity as preconditions. The processing circuitry is further configured to search for an action to move the ship to a target position by a model predictive control in a search range having the initial search value as an origin, and determine a command throttle opening based on the search result.

In some embodiments, the search initial value of the command throttle opening is set by the estimation method based on uncertainty using the distance between the ship and the target position and the true wind velocity. As a result, the initial search value of the command throttle opening becomes a value which more surely reflects the state of the ship. Therefore, the command throttle opening is more reliably set by the model predictive control.

In the ship control device, the estimation method based on the uncertainty is a fuzzy inference using a membership function.

In some embodiments, setting of search conditions may be performed by a general-purpose inference.

The processing circuitry is further configured to estimate a state of the ship based on antecedent parts of membership functions concerning the distance and the true wind velocity, and calculate the initial search value based on the state of the ship.

In some embodiments, the setting accuracy of the initial search value of the command throttle opening by fuzzy inference is improved.

In the ship control system of the present disclosure, the processing circuitry is further configured to set more variables for the antecedent part of the membership function related to true wind velocity than variables for setting the antecedent part of the membership function related to the distance.

In some embodiments, the initial search value of the command throttle opening is set more accurately.

In the ship control system of the present disclosure, the processing circuit is further configured to utilize a discrete throttle opening value as a consequent part of the membership function.

In some embodiments, the initial search value of the throttle opening is set with high accuracy by a simpler calculation.

In the ship control system of the present disclosure, the ship control system further includes a wind sensor and a position sensor. The wind sensor configured to measure the true wind velocity around the position of the ship. The position sensor configured to measure the position of the ship.

In some embodiments, the ship control system further includes a heading sensor configured to measure a heading of the ship. The wind sensor further acquires a wind direction around the position of the ship. The processing circuitry is further configured to set a positive or negative sign of the command throttle opening based on the wind direction, the heading of the ship, and the position of the ship.

In some embodiments, the processing circuitry is further configured to set a coordinate system for setting the sign of the command throttle opening based on the wind direction, determine heading of the ship setting coordinate system for setting the sign based on the heading of the ship in an absolute coordinate system and angular difference between the coordinate system for setting the sign and the absolute coordinate system, and determine the sign based on the heading of the ship and position of the ship in the coordinate system for setting sign.

In the ship control system of the present disclosure, the processing circuitry is further configured to set the search range according to a cycle that controls the ship.

In some embodiments, the search range is set appropriately. Thus, the designated throttle opening is appropriately searched according to the ship control.

In the ship control device of the present disclosure, the processing circuitry is configured to use any one of gaussian process regression, kernel ridge regression, linear regression, and neural network as model predictive control.

In some embodiments, model predictive control may be performed by an appropriate method.

In some embodiments, the processing circuitry is further configured to utilize a discrete throttle opening value as a consequent part of the membership function.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 5A and 5B show an example of a fuzzy table according to an embodiment of the present disclosure;

FIG. 10 is a diagram showing an example of a setting table of symbols of throttle opening according to an embodiment of the present disclosure.

DETAILED DESCRIPTION OF THE EMBODIMENTS

Figure 1:
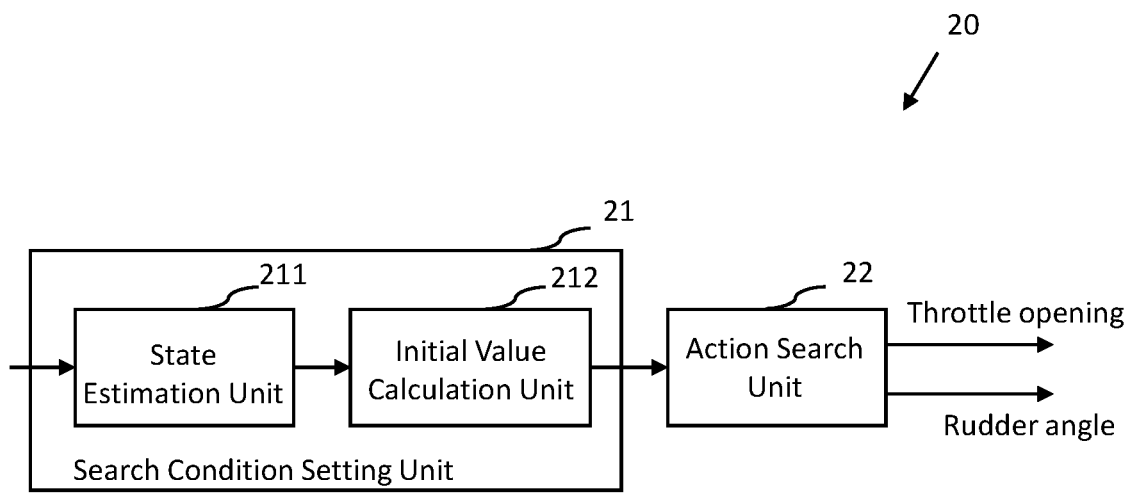
FIG. 1 is a functional block diagram showing a configuration of an autopilot control unit (AP controller) (i.e., processing circuitry) according to an embodiment of the present disclosure.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 2:
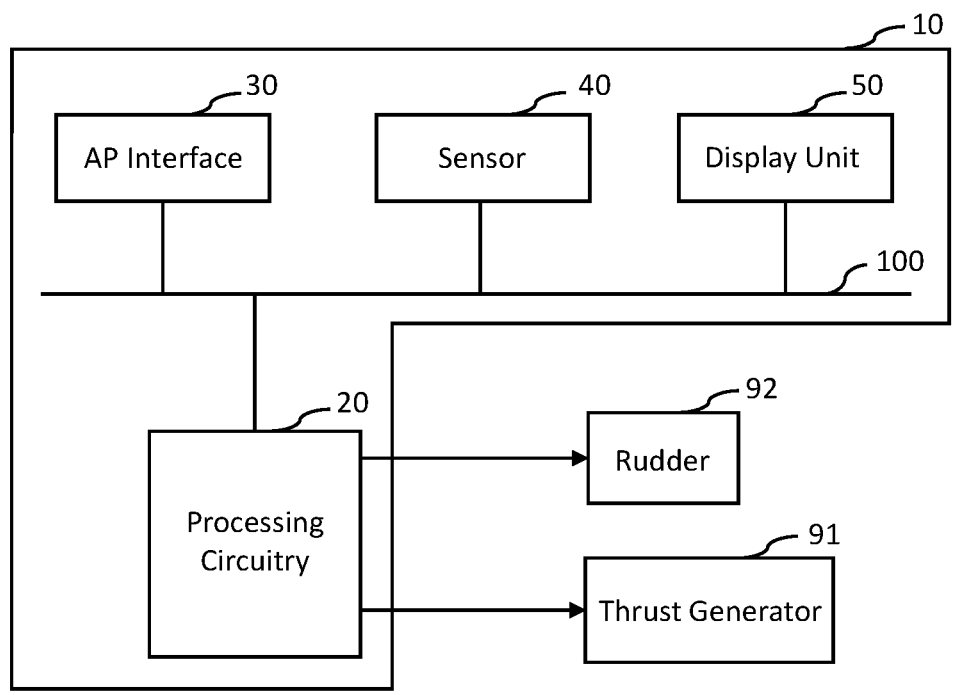
FIG. 2 is a functional block diagram showing the configuration of a ship control system including a ship control device according to an embodiment of the present disclosure.
Figure 3:
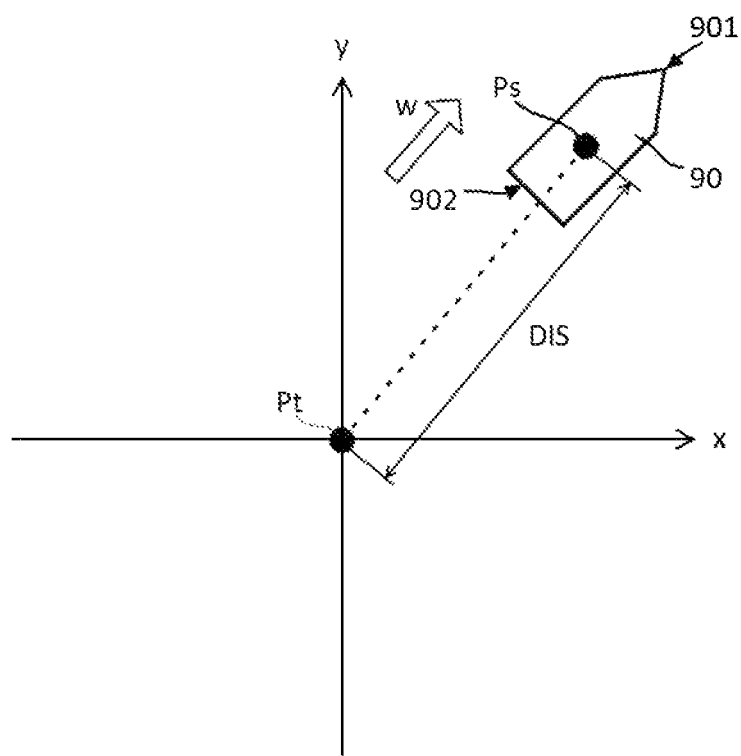
FIG. 3 illustrates the concept of state acquisition according to an embodiment of the present disclosure.

A ship control apparatus, a ship control method, and a ship control program according to a first embodiment of the present disclosure will be described with reference to the drawings. FIG. 1 is a functional block diagram showing a configuration of an autopilot (AP) control unit (hereinafter also referred to as "AP controller" or "processing circuitry") according to an embodiment of the present disclosure. FIG. 2 is a functional block diagram showing a configuration of a ship control system including a ship control device according to an embodiment of the present disclosure. FIG. 3 is a diagram for explaining the concept of state acquisition according to an embodiment of the present disclosure. FIG. 3 shows a target position as a reference point.

First, the structure of the ship control device 10 will be described with reference to FIG. 2. As shown in FIG. 2, the ship control device 10 includes an AP controller 20 (i.e., the processing circuitry 20), an AP interface 30, a sensor 40, and a display unit 50. The ship control device 10 is installed in a hull 90 of a ship for performing autopilot control (automatic navigation control).

The ship control device 10 is connected to a thrust generator 91 and a rudder 92. The thrust generator 91 and the rudder 92 are provided in, for example, an outboard motor, an inboard motor, an inboard/outboard motor, and various propellers. The thrust generator 91 and the rudder 92 are each provided on the hull 90. That is, the ship equipped with the ship control device 10 of the present embodiment is a so-called ship having one shaft and one rudder.

The AP controller 20, the AP interface 30, the sensor 40, and the display unit 50 are connected to each other by, for example, a data communication network 100 for ships.

The AP controller 20 and the thrust generator 91 are connected via, for example, a propulsion communication network (CAN or the like). The AP controller 20 and the rudder 92 are connected, for example, via analog voltage or data communication.

The processing circuitry 20 (i.e., the AP controller 20) sets a command throttle opening and outputs the command throttle opening to the thrust generator 91. Details of the setting method of the command throttle opening will be described later. The AP controller 20 sets a steering angle and outputs the steering angle to the rudder 92. The steering angle is set by an azimuth of the target position Pt with respect to the hull 90, the distance between a position Ps of the hull 90 and the target position Pt, a heading yrs, and the like, but the specific contents of the setting method are omitted.

The AP interface 30 is realized by, for example, a touch panel, a physical button, or a switch. The AP interface 30 accepts a setting operation related to the autopilot control including a target position Pt (see FIG. 3). The AP interface 30 outputs the setting contents including the target position Pt to the AP controller 20.

The sensor 40 (i.e., a position sensor and a heading sensor of the sensor 40) acquires the position Ps of the hull 90 of the ship equipped with the ship control device 10 and a state of the hull such as the heading $\psi$s. For example, the sensor 40 is realized by a positioning sensor using a positioning signal of a GNSS (For example, GPS), an inertial sensor (an acceleration sensor, an angular velocity sensor, etc.), a magnetic sensor, or the like.

The sensor 40 (i.e., a wind senor of the sensor 40) acquires a true wind velocity w (see FIG. 3). The true wind velocity is the wind speed in an absolute coordinate system not depending on the state of the hull 90. For example, the sensor 40 includes an anemometer. The anemometer measures wind velocity (relative wind velocity) of wind blowing on the hull 90. The sensor 40 calculates the true wind velocity by using the relative wind velocity, the heading $\psi$s, and the ship speed. The sensor 40 is provided with a true wind velocity sensor, and the true wind velocity w may be acquired by the true wind velocity sensor.

The sensor 40 outputs the acquired state of the hull (Information including at least the position Ps of the hull, the heading $\psi$s, and the true wind speed w) to the AP controller 20.

The display unit 50 is realized by, for example, a liquid crystal display. The display unit 50 displays target information, information related to the autopilot control, and the like when they are input from the AP controller 20. Although the display unit 50 may be omitted, it is preferable to have the display unit 50, and the user may easily grasp the target state, the autopilot control state, and the like.

The processing circuitry 20 (i.e., AP controller 20) includes, for example, an arithmetic processing unit such as a CPU and a storage unit such as a semiconductor memory. The storage unit stores a program to be executed by the AP controller 20. The storage unit is used when the CPU performs operations.

As shown in FIG. 1, functionally, the AP controller 20 includes a search condition setting unit 21 and an action search unit 22.

The search condition setting unit 21 sets an initial search value of a throttle opening by using fuzzy inference from the state of the ship inputted from the sensor 40. More specifically, the search condition setting unit 21 sets the initial search value of the throttle opening as follows. The search condition setting unit 21 includes a state estimation unit 211 and an initial value calculation unit 212.

The state estimation unit 211 receives the state of the ship (More specifically, at least the position Ps of the ship and the true wind velocity w) from the sensor 40. The target position Pt of dynamic positioning is input to the state estimation unit 211 from the AP interface 30 or the like.

The state estimation unit 211 calculates a distance (distance deviation) DIS between the ship position Ps and the target position Pt using the ship position Ps and the target position Pt (see FIG. 3).

Figure 4A:
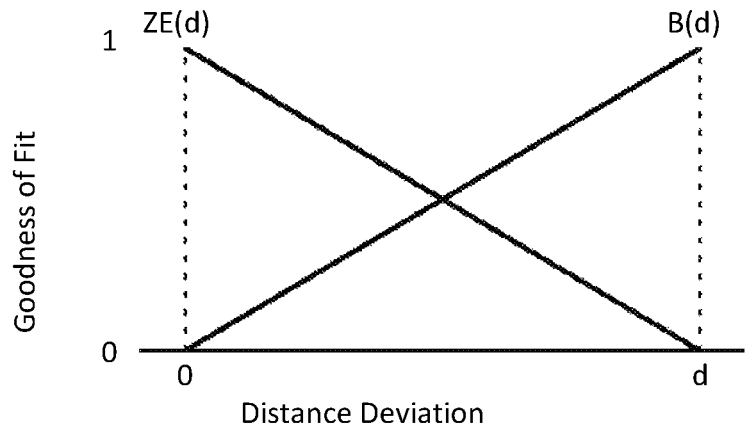
FIG. 4A shows an example of the antecedent part of membership function of distance.

The state estimation unit 211 sets an antecedent part of membership functions of the distance deviation and an antecedent part of membership functions of the true wind velocity. FIG. 4A is a diagram showing an example of the antecedent part of membership functions of the distance, and FIG. 4B is a diagram showing an example of the antecedent part of membership functions of the true wind velocity according to an embodiment of the present disclosure.

As shown in FIG. 4A, the antecedent part of the membership functions of the distance deviation is set by a ZE (d) function and a B (d) function. The ZE (d) function is defined by a line with a fit of 1 at distance deviation 0 and a fit of 0 at distance deviation d. The B (d) function is defined by a straight line having a fitness of 0 with a distance deviation of 0 and a fitness of 1 with a distance deviation of d. The distance deviation d is set by the user. The distance deviation d is set in accordance with a desired distance of the hull 90 from the target position Pt. In other words, the distance deviation d corresponds to the radius of the circular range around the target position Pt.

Figure 4B:
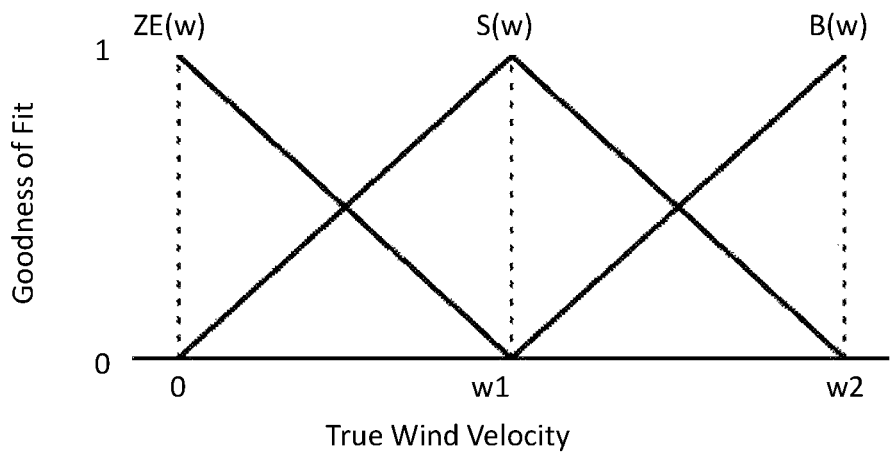
FIG. 4B shows an example of the antecedent part of membership function of true wind speed according to an embodiment of the present disclosure.

As shown in FIG. 4B, the antecedent part of the membership functions of the true wind velocity is set by a ZE (w) function, a S (w) function, and a B (w) function. The ZE (w) function is defined by a straight line whose goodness of fit is 1 at wind speed 0 and 0 at wind speed w1. The S (w) function is defined by a straight line having a fitness of 0 at wind speed 0 and a fitness of 1 at wind speed w1, and a straight line having a fitness of 1 at wind speed w1 and a fitness of 0 at wind speed w2. The B (w) function is defined by a straight line whose goodness of fit is 0 at wind velocity w1 and 1 at wind velocity w2. The wind speeds v1 and v2 are set by the user, and the wind speed v2 is set to be larger than the wind speed v1, for example, twice the wind speed v1. The wind speeds w1 and w2 are general wind speeds referred to as disturbance factors for maintaining a fixed point.

The state estimation unit 211 calculates the goodness of fit of the distance deviation to each function of the antecedent part of the membership functions of the distance deviation. The state estimation unit 211 calculates the compatibility of the wind speed to each function of the antecedent part of the membership functions of the true wind velocity. The state estimation unit 211 outputs the compatibility of the distance deviation and the compatibility of the wind velocity to the initial value calculation unit 212.

The initial value calculation unit 212 determines the goodness of fit of a consequent part of the membership functions by using the goodness of fit of the distance deviation, the goodness of fit of the wind velocity and the fuzzy table. FIGS. 5A and 5B are diagrams showing an example of a fuzzy table according to an embodiment of the present disclosure. FIG. 5A shows a case where the wind separates the hull 90 from the target position Pt, and FIG. 5B shows a case where the wind brings the hull 90 to the target position Pt. In FIGS. 5A and 5B, S, M and B correspond to the singleton of the consequent part of the membership functions. As shown in FIGS. 5A and 5B, the fuzzy table describes the relationship between each function of the antecedent part of the membership function and each function of the consequent part of the membership function.

The initial value calculation unit 212 detects whether the wind separates the hull 90 from the target position Pt or the wind brings the hull 90 to the target position Pt by using the positional relationship between the hull 90 and the target position Pt and the true wind direction (wind direction in the absolute coordinate system: obtainable by the sensor 40).

When the wind separates the hull 90 from the target position Pt, the initial value calculation unit 212 determines the goodness of fit of each function of the consequent part of the membership function from the goodness of fit of each function of the antecedent part of the membership function using the fuzzy table shown in FIG. 5A.

When the wind brings the hull 90 to the target position Pt, the initial value calculation unit 212 uses the fuzzy table shown in FIG. 5B to determine the goodness of fit of each function of the consequent part of the membership function from the goodness of fit of each function of the antecedent part of the membership function. At this time, the initial value calculation unit 212 determines the goodness of fit of each function of the consequent part of the membership function by using the Min-Max operation.

The initial value calculation unit 212 substitutes the fitness of each function of the determined consequent part of the membership function into the consequent part of the membership function and calculates the initial search value of the discrete throttle opening value.

Figure 6:
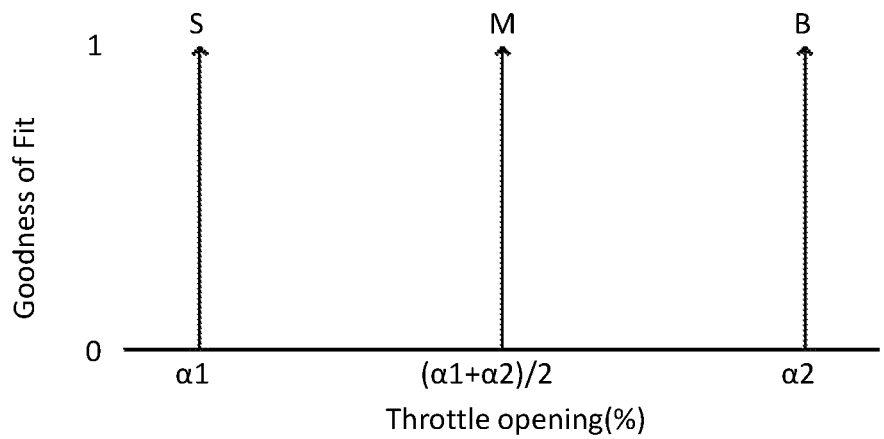
FIG. 6 shows an example of a consequent part of membership function according to an embodiment of the present disclosure.

FIG. 6 is a diagram showing an example of the consequent part of the membership function according to an embodiment of the present disclosure. As shown in FIG. 6, the consequent part of the membership function is set by singleton S, M, and B functions. The S function corresponds to the throttle opening $\alpha 1$, the M function corresponds to the throttle opening $(\alpha 1+\alpha 2)/2$, and the B function corresponds to the throttle opening $\alpha 2$. The throttle opening $\alpha 2$ corresponds, for example, to the maximum throttle opening that may be output. The throttle opening $\alpha 1$ corresponds to a predetermined value (For example, 0) smaller than the throttle opening $\alpha 2$.

The initial value calculation unit 212 calculates the center of gravity $\tau 0$ of the throttle opening degree from the fitness degree of the S function, the fitness degree of the M function, the fitness degree of the B function, the throttle opening degree al corresponding to the S function, the throttle opening degree $(\alpha 1+\alpha 2)/2$ corresponding to the M function, and the throttle opening degree $\alpha 2$ corresponding to the B function. The initial value calculation unit 212 sets the center of gravity $\tau 0$ of the throttle opening to a search initial value of the throttle opening. The initial value calculation unit 212 outputs the initial search value of the throttle opening to the action search unit 22.

Figure 7A:
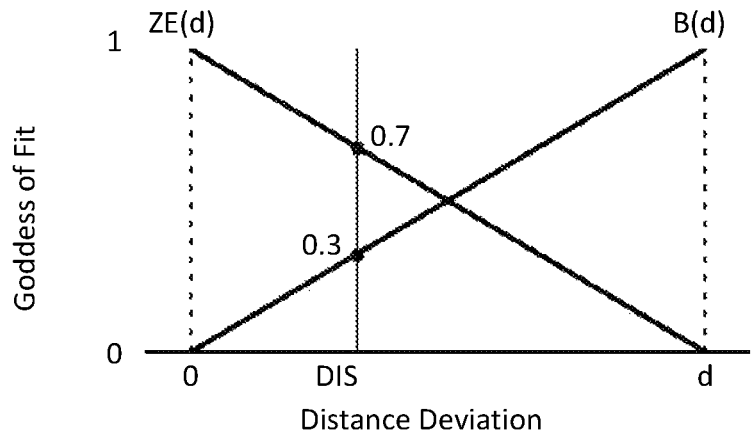
FIGS. 7A-7C are diagrams showing an example of calculation of the initial value of the search for the throttle opening according to an embodiment of the present disclosure.
Figure 7B:
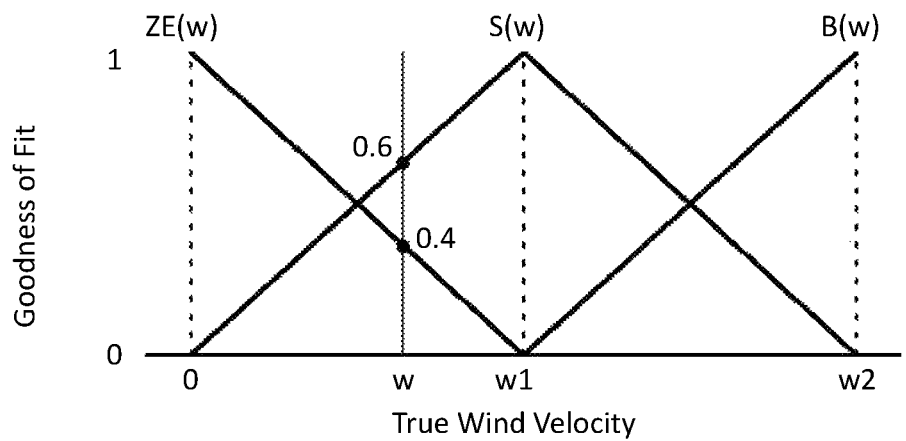
Figure 7C:
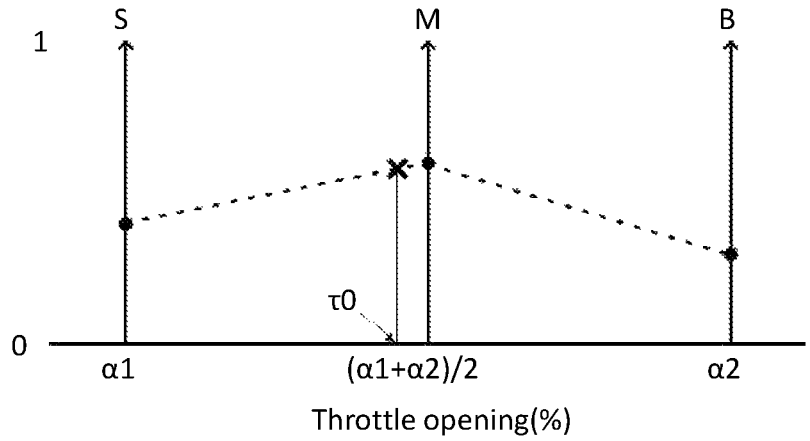

FIGS. 7A, 7B, and 7C are diagrams showing an example of calculation of the initial value of the search for the throttle opening according to an embodiment of the present disclosure. FIG. 7A shows the antecedent part of the membership function of the distance deviation, FIG. 7A shows the antecedent part of the membership function of the true wind speed, and FIG. 7A shows the antecedent part of the membership function.

In FIG. 7A, the distance DIS is the goodness of fit 0.7 of the ZE (d) function and the goodness of fit 0.3 of the B (d) function. In the case of FIG. 7B, the true wind velocity w is the goodness of fit 0.4 of the ZE (w) function and the goodness of fit 0.6 of the S (w) function.

If the wind separates the hull 90 from the target position Pt, the fuzzy table shown in FIG. 5A is used. The goodness of fit of the S function of the consequent part of the membership function is set by applying the Min operation to the combination of ZE (d) and ZE (w). Therefore, the goodness of fit of the S function is the smaller of 0.7 and 0.4 (0.4). The goodness of fit of the M function of the consequent part of the membership function is set by applying the Min operation to the combination of ZE (d) and S (w), applying the Min operation to the combination of B (d) and ZE (w), and the Max operation. Therefore, the goodness of fit of the M function is the maximum value (0.6) of the smaller of 0.7 and 0.6 (0.6) and the smaller of 0.4 and 0.3 (0.3).

The goodness of fit of the B function of the consequent part of the membership function is set by applying the Min operation to the combination of B (d) and S (w). Thus, the fitness of the B function is the smaller of 0.6 and 0.3 (0.3).

From the goodness of fit 0.4 of the S function, the goodness of fit 0.6 of the M function, and the goodness of fit 0.3 of the B function, the throttle opening $\alpha 1$ of the S function, the throttle opening $(\alpha 1 + \alpha 2)/2$ corresponding to the M function, and the throttle opening $\alpha 2$ corresponding to the B function, the center of gravity $\tau 0$ of the throttle opening is calculated as follows.

$$\tau 0 = (0.4\alpha 1 + 0.6((\alpha 1 + \alpha 2)/2) + 0.3\alpha 2)/(0.4 + 0.6 + 0.3)$$

Thus, by calculating the initial search value of the throttle opening using fuzzy inference, the search condition setting unit 21 may more appropriately set the search origin of the throttle opening of the model predictive control executed by the action search unit 22 according to the state of the hull including the disturbance. Further, the search condition setting unit 21 may set the search origin with a higher accuracy even if there is a disturbance.

The action search unit 22 sets the initial search value of the throttle opening obtained from the search condition setting unit 21 as the search origin of a search range in the model predictive control. The action search unit 22 sets the search range based on the control cycle for holding a fixed point.

The action search unit 22 uses any one of Gaussian process regression, kernel ridge regression, linear regression, and neural network as model predictive control. As described above, the action search unit 22 searches for the throttle opening using the model predictive control in which the search origin and the search range are set, and determines the command throttle opening. It should be noted that the model predictive control is not limited to the types described above, and may be any control that may estimate (predict) the designated throttle opening using regression analysis set by a predetermined function under conditions in which the search origin and the search range are set, such as other various regression models.

By using such a configuration and processing, the ship control device 10 may appropriately set the command throttle opening in accordance with the state of the hull including the disturbance. Thus, the ship control device 10 may perform the fixed point holding control with high accuracy and stability.

Figure 8:
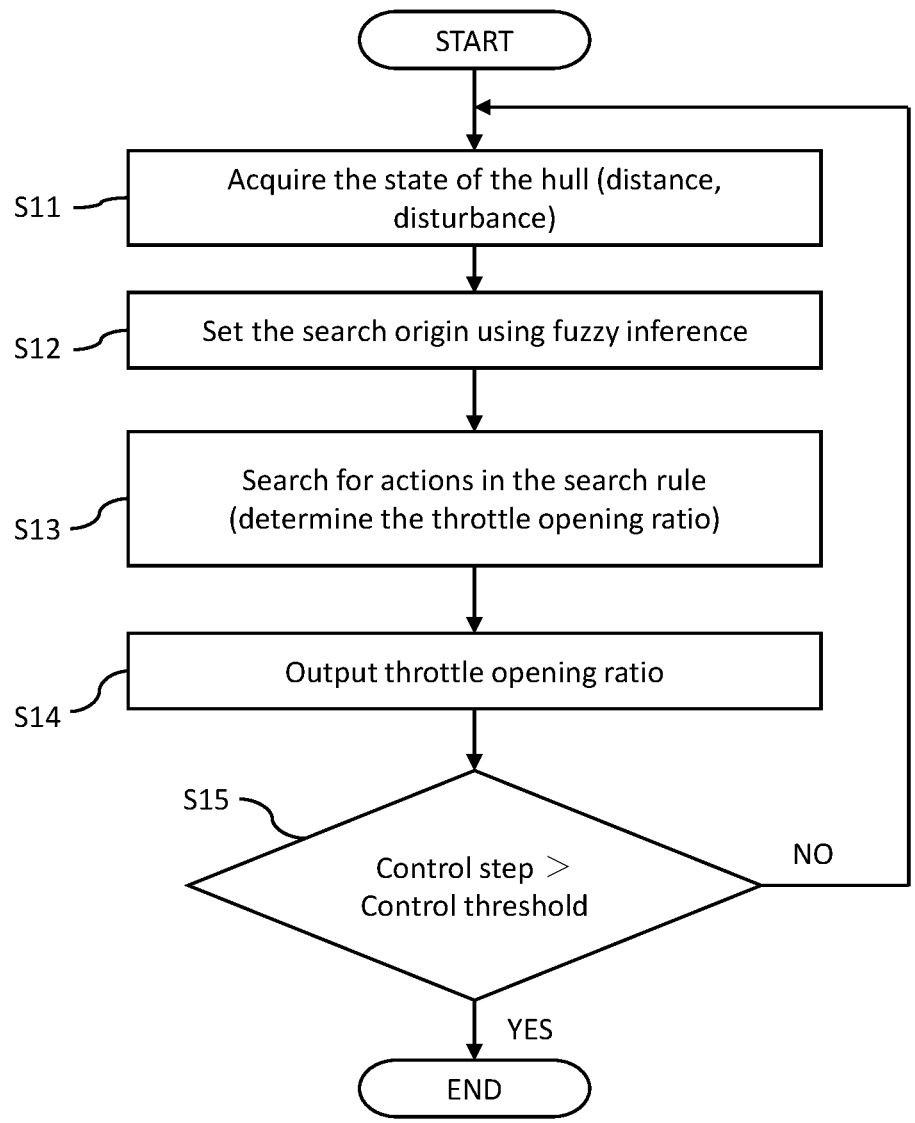
FIG. 8 is a flow chart showing a main process of a ship control method according to an embodiment of the present disclosure.

In the above description, each process of ship control (AP control) is performed in a plurality of functional sections. However, it is also possible to realize the ship control described above by storing these processes as a program in a storage unit or the like and executing them in an arithmetic processing unit. In this case, the arithmetic processing unit may execute the following ship control method. FIG. 8 is a flow chart showing the main processing of the ship control method according to the embodiment of the present disclosure. The specific contents of the processes shown in FIG. 8 have been described above, and a specific description thereof will be omitted below.

As shown in FIG. 8, the arithmetic processing unit acquires the state of the hull including the position Ps and the wind velocity w of the hull 90 (S 11).

The arithmetic processing unit sets an initial search value (search origin) of the throttle opening by using fuzzy inference with the distance DIS between the position Ps of the hull 90 and the target position Pt and the true wind velocity v as preconditions (S 12).

The arithmetic processing searches for an action of moving the hull 90 to a target position Pt by model predictive control in a search range (search rule) having the initial search value as an origin (S 13). The arithmetic processing determines the command throttle opening from the search result.

The arithmetic processing unit outputs the command throttle opening to the thrust generator 91 (S 14). The arithmetic processing unit sets a control threshold in advance, and when this series of control steps is performed until the control threshold is exceeded (S 15: YES), the control is ended. On the other hand, the arithmetic processing apparatus repeats this series of control steps until this series of control steps is performed the number of times of the threshold for control (S 15: NO).

In the above description, a specific description of the symbol of the throttle opening is omitted. However, the search condition setting unit 21 of the AP controller 20 sets a positive or negative sign of the command throttle opening based on the wind direction, the heading of the ship, and the position of the ship by the following method.

Figure 9:
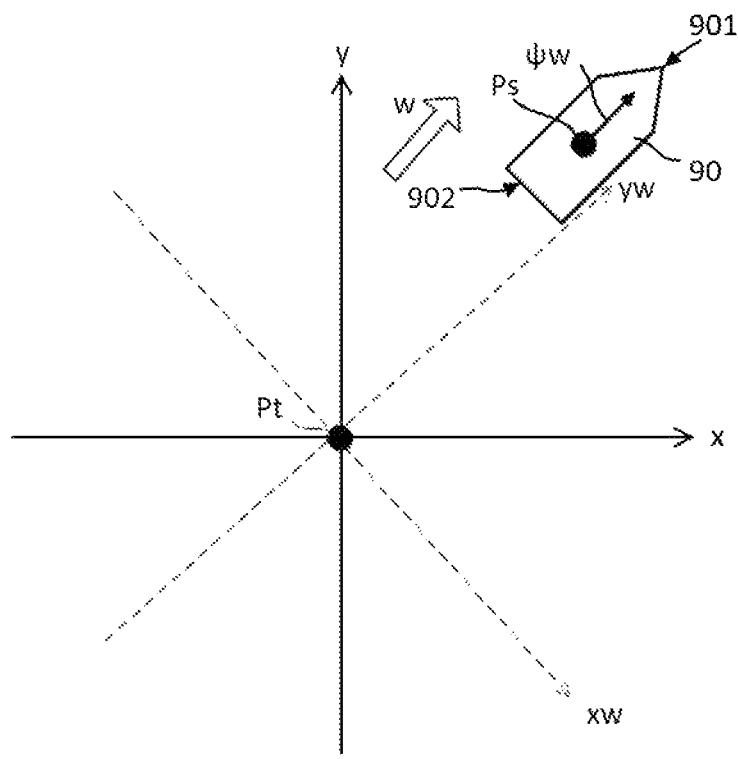
FIG. 9 is a diagram for explaining the concept of setting the symbol of the throttle opening according to an embodiment of the present disclosure.

FIG. 9 is a diagram for explaining the concept of setting the symbol of the throttle opening according to an embodiment of the present disclosure. FIG. 10 is a diagram showing an example of a setting table of symbols of throttle opening degrees according to an embodiment of the present disclosure.

When the sign of the throttle opening degree is set, the sensor 40 acquires the wind direction (wind direction) in the absolute coordinate system together with the bow direction $\psi s$ in the absolute coordinate system.

The search condition setting unit 21 sets a coordinate system for setting the code of the throttle opening by using the wind direction. Specifically, the search condition setting unit 21 rotates the absolute coordinate system (x-y coordinate system in FIG. 9) by using the wind direction (wind direction), and sets a coordinate system (xw-yw coordinate system in FIG. 9) for setting the sign of the throttle opening.

The search condition setting unit 21 rotates the bow azimuth $\psi s$ of the absolute coordinate system by the angle difference between the absolute coordinate system and the coordinate system for code setting of the throttle opening degree, and calculates the bow azimuth $\psi w$ of the coordinate system for code setting of the throttle opening degree.

The search condition setting unit 21 applies the position Ps of the hull 90 in the coordinate system for code setting of the throttle opening (the xw-yw coordinate system in FIG. 9) and the heading $\psi w$ in the coordinate system for code setting of the throttle opening (the xw-yw coordinate system in FIG. 9) to the setting table of the throttle opening code shown in FIG. 10, and sets the throttle opening code (the throttle code). For example, as shown in FIG. 10, when the position Ps of the hull 90 is "+" in the xw coordinate, "+" in the yw coordinate, and the heading $\psi w$ is "0° to 90°," the search condition setting unit 21 sets the sign of the throttle opening to "−." In other cases, the symbol of the throttle opening may be set with reference to FIG. 10, but the description thereof will be omitted.

By performing such processing, the search condition setting unit 21 may appropriately set the initial value code of the throttle opening in accordance with the disturbance, and consequently, may appropriately set the command throttle opening.

Thus, the ship control device 10 may set the command throttle opening more appropriately in accordance with the state of the hull including the disturbance. Therefore, the ship control device 10 may perform the fixed point holding control with higher accuracy.

In the above description, as the antecedent part of the membership function, the variable of distance (a reference value for determining the antecedent part of the membership function) is a binary value (0, d), and the variable of true wind speed (a reference value for determining the antecedent part of the membership function) is a ternary value (0, w1, w2). However, these settings are only examples, and the set number of values for determining the antecedent part of the membership function of the distance (variable for the distance) and the value for determining the antecedent part of the membership function of the true wind speed (variable for the true wind speed) may be at least two values or more. However, by setting the variable of the distance to 2 values and the variable of the true wind velocity to 3 values, the suitability of the position Ps of the hull 90 with respect to the target position Pt and the true wind velocity w may be set relatively accurately with a simple process.

In the above description, a mode using fuzzy inference is shown. However, the estimation method of the search condition based on uncertainty is not limited to fuzzy inference, and other estimation methods can be used.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A ship control system, comprising:
processing circuitry configured to:
estimate an initial search value of a throttle opening by an estimation method based on uncertainty with a distance between a position of a ship and a target position of dynamic positioning, and a true wind velocity as preconditions; and
search for an action of moving the ship to the target position by a model predictive control in a search range having the initial search value as an origin, and determine a command throttle opening based on the search result.

2. The ship control system of claim 1, wherein:
the estimation method based on the uncertainty is a fuzzy inference using a membership function.

3. The ship control system of claim 2, wherein the processing circuitry is further configured to:
estimate a state of the ship based on antecedent parts of membership functions related to each of the distance and the true wind velocity; and
calculate the initial search value based on the state of the ship.

4. The ship control system of claim 3, wherein the processing circuitry is further configured to:
set more variables for the antecedent part of the membership function related to the true wind velocity than variables for setting the antecedent part of the membership function related to the distance.

5. The ship control system of claim 3, wherein the processing circuitry is further configured to:
utilize a discrete throttle opening value as a consequent part of the membership function.

6. The ship control system of claim 1, further comprising:
a wind sensor configured to measure the true wind velocity around the position of the ship, and
a position sensor configured to measure the position of the ship.

7. The ship control system of claim 6, further comprising:
a heading sensor configured to measure a heading of the ship; wherein:
the wind sensor further acquires a wind direction around the position of the ship, and the processing circuitry is further configured to set a positive or negative sign of the command throttle opening based on the wind direction, the heading of the ship, and the position of the ship.

8. The ship control system of claim 7, wherein the processing circuitry is further configured to:
set a coordinate system for setting the sign of the command throttle opening based on the wind direction;
determine heading of the ship setting coordinate system for setting the sign based on the heading of the ship in an absolute coordinate system and an angular difference between the coordinate system for setting the sign and the absolute coordinate system; and
determine the sign based on the heading of the ship and position of the ship in the coordinate system for setting the sign.

9. The ship control system of claim 1, wherein the processing circuitry is further configured to:
set the search range according to a cycle that controls the ship.

10. The ship control system of claim 1, wherein the processing circuitry is further configured to:
use any one of a gaussian process regression, a kernel ridge regression, a linear regression, and a neural network as the model predictive control.

11. The ship control system of claim 4, wherein the processing circuitry is further configured to:
utilize a discrete throttle opening value as a consequent part of the membership function.

12. The ship control system of claim 11, further comprising:
a wind sensor configured to measure the true wind velocity around the position of the ship, and
a position sensor configured to measure the position of the ship.

13. The ship control system of claim 12, further comprising:

a heading sensor configured to measure a heading of the ship, wherein:
the wind sensor further acquires a wind direction around the position of the ship, and
the processing circuitry is further configured to set a positive or negative sign of the command throttle opening is set based on the wind direction, the heading of the ship, and the position of the ship.

14. The ship control system of claim 13, wherein the processing circuitry is further configured to:
set a coordinate system for setting the sign of the command throttle opening based on the wind direction;
determine a heading of the ship in the coordinate system for setting the sign based on the heading of the ship in the absolute coordinate system and an angular difference between the coordinate system for setting the sign and an absolute coordinate system; and
determine the sign based on the heading of the ship and the position of the ship in the coordinate system for setting the sign.

15. The ship control system of claim 14, wherein the processing circuitry is further configured to:
set the search range according to a cycle that controls the ship.

16. The ship control system of claim 15, wherein the processing circuitry is further configured to:
use any one of a gaussian process regression, a kernel ridge regression, a linear regression, and a neural network as the model predictive control.

17. A ship control method, comprising:
estimating an initial search value of a throttle opening by utilizing an estimation method based on uncertainty with a distance between a position of a ship and target position of dynamic positioning, and a true wind velocity as preconditions;
searching for an action of moving the ship to the target position by model predictive control in a search range having the initial search value as an origin; and
setting a command throttle opening based on the search result.

18. A non-transitory computer-readable medium having stored thereon computer-executable instructions which, when executed by a computer, cause the computer to:
estimate an initial search value of a throttle opening by utilizing an estimation method based on uncertainty with a distance between a position of a ship and a target position of dynamic positioning, and a true wind velocity as preconditions;
search for an action of moving the ship to the target position by model predictive control in a search range having the initial search value as an origin; and
set a command throttle opening based on the search result.

* * * * *